United States Patent
Gluntz

[11] Patent Number: 5,499,278
[45] Date of Patent: Mar. 12, 1996

[54] WATER INVENTORY MANAGEMENT IN CONDENSER POOL OF BOILING WATER REACTOR

[75] Inventor: Douglas M. Gluntz, San Jose, Calif.

[73] Assignee: General Electric Company, San Jose, Calif.

[21] Appl. No.: 402,589

[22] Filed: Mar. 13, 1995

[51] Int. Cl.$^6$ .................................................. G21C 15/18
[52] U.S. Cl. .................................................. 376/299; 165/1
[58] Field of Search .................................. 376/283, 298, 376/299, 367; 165/1, 13

[56] References Cited

U.S. PATENT DOCUMENTS

| | | | |
|---|---|---|---|
| 3,677,229 | 7/1972 | Blough et al. | 119/28 |
| 4,019,338 | 4/1977 | Poteet | 62/324.3 |
| 4,950,448 | 8/1990 | Gou et al. | 376/283 |
| 5,272,737 | 12/1993 | Fujii et al. | 376/283 |
| 5,295,168 | 3/1994 | Gluntz et al. | 376/283 |

FOREIGN PATENT DOCUMENTS

| | | | |
|---|---|---|---|
| 63-33697 | 2/1988 | Japan | 376/367 |
| 63-223593 | 9/1988 | Japan | 376/283 |

*Primary Examiner*—Daniel D. Wasil
*Attorney, Agent, or Firm*—James E. McGinness

[57] ABSTRACT

An improved system for managing the water inventory in the condenser pool of a boiling water reactor has means for raising the level of the upper surface of the condenser pool water without adding water to the isolation pool. A tank filled with water is installed in a chamber of the condenser pool. The water-filled tank contains one or more holes or openings at its lowermost periphery and is connected via piping and a passive-type valve (e.g., squib valve) to a high-pressure gas-charged pneumatic tank of appropriate volume. The valve is normally closed, but can be opened at an appropriate time following a loss-of-coolant accident. When the valve opens, high-pressure gas inside the pneumatic tank is released to flow passively through the piping to pressurize the interior of the water-filled tank. In so doing, the initial water contents of the tank are expelled through the openings, causing the water level in the condenser pool to rise. This increases the volume of water available to be boiled off by heat conducted from the passive containment cooling heat exchangers.

4 Claims, 4 Drawing Sheets 5,499,278

WATER INVENTORY MANAGEMENT IN CONDENSER POOL OF BOILING WATER REACTOR

The Government of the United States of America has rights in this invention in accordance with Contract No. DE-AC03-90SF18494 awarded by the Department of Energy.

FIELD OF THE INVENTION

This invention relates generally to protection systems for shutting down a boiling water reactor (BWR) and maintaining it in a safe condition in the event of a system transient or malfunction that might cause damage to the nuclear fuel core, most likely from overheating. In particular, the invention relates to passive systems applied to BWRs for suppressing the pressure inside the containment following a postulated accident.

BACKGROUND OF THE INVENTION

BWRs have conventionally utilized active safety systems to control and mitigate accident events. Those events varied from small break to design basis accidents. Passive safety systems have been studied for use in simplified BWRs (SBWRs) because of their merits in reducing specialized maintenance and surveillance testing of the safety-related equipment, and in eliminating the need for AC power, thereby improving the reliability of essential safety system responses necessary for the control and mitigation of adverse effects produced by accidents. SBWRs can additionally be designed with certain passive safety features that provide more resistance to human error in accident control and mitigation.

The current SBWR designs utilize passive operational principles for the key safety systems employed to (a) provide emergency coolant injection, for assured core cooling over the design basis post-LOCA lifetime (specifically, 72 hr for these designs), and (b) provide assured containment heat removal over this same design basis accident duration. The decay heat removal accomplishes, by essentially passive means, the transfer of core decay heat (which manifests itself ultimately as hot steam inside the containment drywell) to the reactor building environs through the use of passive containment cooling (PCC) heat exchangers, as disclosed, for example, in U.S. Pat. No. 5,295,168.

The term "passive" as used to describe the actions of such safety systems, is defined to include systems which operate exclusively on stored energy, such as batteries, or pressurized gases, or chemical charges, or appropriately positioned tanks of water which can drain by gravity, to accomplish the essential safety function. The term "passive" further implies that no rotating or reciprocating machinery is used; valves, where used, are one-time change-of-position valves such as squib valves, or, in the case of check valves, are altogether unpowered insofar as their open/close state is concerned. Where water is used in such passive systems for flooding, quantities must be sufficient to accomplish all design goals over the prescribed accident period, i.e., 72 hr. Where water is used for decay heat rejection via the process of evaporation, quantities again must be sufficient to allow for boiloff of such pools without the pool drawdown uncovering the critical heat exchanger heat transfer surfaces (tubes) through which the heat is transferred via condensation of steam inside the tubes, and evaporation of a secondary water quantity (pool) external to these tubes, which secondary pool communicates via piping/ducting to the environs.

A typical SBWR reactor building arrangement has a plurality of PCC heat exchangers positioned in an interconnected series of pool chambers collectively referred to herein as the condenser pool. This pool requires a certain critical water inventory, i.e., the inventory for which the integrated design (pool plus positioned heat exchanger) is reckoned as boiloff volume. Before focusing on this aspect of water inventory management, a brief summary of the overall structure and operation of the current SBWR design is given below.

Referring to FIG. 1, the SBWR includes a reactor pressure vessel 10 containing a nuclear reactor fuel core 12 submerged in water 14. The fuel core heats the water to generate steam 14a which is discharged from the reactor pressure vessel through a main steam line 16 and used to power a steam turbine-generator for producing electrical power.

The reactor pressure vessel is surrounded by a containment vessel 18. The volume inside containment vessel 18 and outside reactor pressure vessel 10 is called the drywell 20. The containment vessel is a concrete structure having a steel liner and is designed to withstand elevated pressure inside the drywell. The drywell typically contains a noncondensable gas such as nitrogen.

In accordance with the conventional SBWR containment design, an annular suppression or wetwell pool 22 surrounds the reactor pressure vessel within the containment vessel. The suppression pool is partially filled with water 24 to define a wetwell airspace or plenum 26 thereabove. The suppression pool 22 serves various functions including being a heat sink in the event of certain accidents. For example, one type of accident designed for is a loss-of-coolant accident (LOCA) in which steam from the reactor pressure vessel 10 leaks into the drywell 20. Following the LOCA, the reactor is shut down but pressurized steam and residual decay heat continue to be generated for a certain time following the shutdown. Steam escaping into the drywell 20 is channeled into the suppression pool 22 through a multiplicity of (e.g., eight) vertical flow channels, each flow channel 27 having plurality of (e.g., three) horizontal vents 28. Steam channeled into the suppression pool 22 through the vents 28 carries with it portions of the drywell noncondensable gas 30. The steam is condensed and the noncondensable gas 30 is buoyed upwardly to the wetwell plenum 26, where it accumulates.

When the pressure in wetwell plenum 26 exceeds that in drywell 20, one or more vacuum breakers 36, which penetrate the wetwell wall, are opened to allow non-condensable gas 30 in the wetwell plenum 26 to vent to the drywell 20. The vacuum breakers 36 remain closed when the pressure in drywell 20 is equal to or greater than the pressure in the wetwell plenum 26.

The system further includes one or more gravity-driven cooling system (GDCS) pools 38 located above the suppression pool 22 within the containment vessel 18. The GDCS pool 38 is partially filled with water 42 to define a GDCS plenum 44 thereabove. The GDCS pool 38 is connected to an outlet line 46 having a valve 48 which is controlled by controller 40. The valve 48 is opened to allow GDCS water 42 to drain by gravity into pressure vessel 10 for cooling the core following a LOCA. Steam and noncondensable gas can be channeled directly into the GDCS plenum 44 from the drywell 20 via an inlet 50. An optional condenser or heat exchanger 72 may be provided for condensing steam channeled through inlet 50 following draining of the GDCS water 42 for drawing in additional steam and noncondensable gas.

The suppression pool 22 is disposed at an elevation which is above the core 12 and is connected to an outlet line 32 having a valve 34 which is controlled by a controller 40. The valve 34 is opened after an appropriate time delay from the opening of valve 48 to allow wetwell water 24 to also drain by gravity into the pressure vessel 10 for cooling the core following a LOCA.

In the SBWR design, a passive containment cooling system (PCCS) is provided for removing heat from the containment vessel 18 during a LOCA. A condenser pool 52, configured as a collection of subpools (not shown) interconnected so as to act as a single common large pool, is disposed above the containment vessel 18 and above the GDCS pool 38. The condenser pool 52 contains a plurality of PCC heat exchangers 54 (only one of which is shown in FIG. 1), also commonly referred to as PCC condensers, submerged in isolation water 56. The condenser pool 52 includes one or more vents 58 to atmosphere outside the containment for venting the airspace above the condenser pool water 56 for discharging heat therefrom upon use of the PCC heat exchanger 54.

The PCC heat exchanger 54 has an inlet line 60 in flow communication with the drywell 20 and an outlet line 62 joined to a collector chamber 64 from which a vent pipe 66 extends into the suppression pool 22 and a condensate return conduit 68 extends into the GDCS pool 38. The PCC heat exchanger 54 provides passive heat removal from the drywell 20 following the LOCA, with steam released into the drywell flowing through inlet 60 into the PCC heat exchanger wherein it is condensed. The noncondensable gas (e.g., nitrogen) within the drywell is carried by the steam into the PCC heat exchanger and must be separated from the steam to provide effective operation of the PCC heat exchanger. The collector chamber 64 separates the noncondensable gas from the condensate, with the separated noncondensable gas being vented into the suppression pool 22, and the condensate being channeled into the GDCS pool 38. A water trap or loop seal 70 is provided at the end of the condensate return conduit 68 in the GDCS pool 38 to restrict backflow of heated fluids from the GDCS pool 38 to the suppression pool 22 via the condensate return conduit 68, which would bypass PCC heat exchanger 54.

Accordingly, this system is configured to transport the noncondensable gas from the drywell 20 to the wet-well plenum 26 and then condense steam from the drywell in the PCC heat exchanger 54. The noncondensable gas will remain in the enclosed wetwell until the PCC heat exchanger 54 condenses steam faster than it is released from the reactor pressure vessel. When this occurs, the PCC heat exchanger lowers the drywell pressure below that of the wetwell, which causes the vacuum breakers 36 to open, thereby allowing noncondensable gas stored in the wetwell to return to the drywell.

As shown in greater detail in FIG. 2, the PCC heat exchanger 54 is a drum and tube heat exchanger comprising an upper drum 74 and a lower drum 76 connected via a multiplicity of vertical tubes 78. The PCC heat exchanger 54 is positioned within reactor building 80 in a chamber 52a of condenser pool 52. Pool chamber 52a is bounded by vertical walls 82 and 84, floor 86 and ceiling 88. The upper surface 90 of ceiling 88 is commonly the refueling floor of reactor building 80. A hatch 92 standing above the PCC heat exchanger 54 has a cover (not shown) which is removable to allow access to PCC heat exchanger 54 for servicing. During operation following a LOCA, as heat is conducted out of PCC heat exchanger 54, secondary steam formed in pool chamber 52a flows through airspace 94 and passes through moisture separator/dryer unit 96 and then through outlet piping 98 to reach the environs outside reactor building 80.

The allowable drawdown (i.e., boiloff) volume for pool chamber 52a has conventionally been taken to be that volume represented by all initial pool inventory located above the lower horizontal tangent to upper drum 74 of PCC heat exchanger 54 (diagrammed as "ELEV. A" in FIG. 2) up to the initial pool surface level. The effective pool inventory is amplified, in this ESBWR design, by providing a multiplicity of interconnected auxiliary pool chambers, where the interconnections are accommodated via piping and open-positioned valves. Auxiliary pool chamber 52b, shown in FIG. 2, is bounded by vertical walls 81 and 84, floor 86 and ceiling 88 and is connected to pool chamber 52a via piping 100 and valve 102. As is evident from FIG. 2, any preferential boiloff occurring to the water inventory in pool chamber 52a is passively replaced by drawdowns via gravity action in all interconnected pool chambers 52b, so that level remains essentially uniform throughout the entire interconnected pool chamber system, namely, condenser pool 52.

As is apparent from the foregoing description, a sizeable portion of condenser pool 52 is "underutilized", i.e., not given credit for boiloff. The underutilized portion is the entire portion of condenser pool 52 standing below ELEV. A in FIG. 2. No other constructive use has yet been identified for this portion of the condenser pool 52, although it is recognized that some very modest credit may associate with a warmup of this water to boiling temperatures.

It would be desirable to minimize the required amounts of water in the condenser pool 52. This is because, among other reasons, such water represents a large mass which is located high in the reactor building 80, and which therefore represents a considerable design challenge to the reactor building structural designer in accommodating the resultant seismic loadings. Even more important, the requirements for adequate boiloff quantity in the condenser pool 52 means that quite some number of "auxiliary" pool chambers 52b must be provided, and this translates into considerable expanse of pool area, which in many cases sets the allowable minimum width and length of the reactor building. Furthermore, any approach which attempts to meet the water inventory need by increasing the depth of the condenser pool results in even greater overall plant costs.

Thus, there is a need for an economically advantageous passive means for constructively employing some selected amount of the heretofore "underutilized" water inventories in auxiliary pool chambers to increase the "credited" amount of heat removal during a LOCA via the PCC heat exchangers.

SUMMARY OF THE INVENTION

The present invention is an improved system for managing the water inventory in the condenser pool of a boiling water reactor. In particular, the invention comprises a means for raising the level of the upper surface of the condenser pool water without adding water to the condenser pool. This is accomplished by displacing a volume of condenser pool water to a higher level.

In accordance with one preferred embodiment, a tank filled with water is installed in a chamber of the isolation pool. The water-filled tank contains one or more holes or openings at its lowermost periphery and is connected via piping and a passive-type valve (e.g., squib valve) to a high-pressure gas-charged pneumatic tank of appropriate volume. The valve is normally closed, but can be opened at an appropriate time following a LOCA. When the valve opens, high-pressure gas, such as nitrogen, inside the pneumatic tank is released to flow passively through the piping to pressurize the interior of the water-filled tank. In so doing, the initial water contents of the tank are expelled through the openings, causing the water level in the condenser pool to rise. This increases the volume of water available to be boiled off by heat conducted from the passive containment cooling heat exchangers.

The nitrogen is supplied to the pneumatic tank by high-pressure nitrogen gas supply. In accordance with the preferred embodiment, the accumulator tank of a standby liquid control system for injecting poison solution into the fuel core of a BWR can serve the dual function of providing high-pressure gas to the pneumatic tank of the present invention.

Alternatively, the means for displacing condenser pool water to a higher level can be an inflatable bladder anchored in the condenser pool or a movable wall forming part of an auxiliary chamber of the condenser pool.

DETAILED DESCRIPTION OF THE PREFERRED EMBODIMENTS

Figure 1:
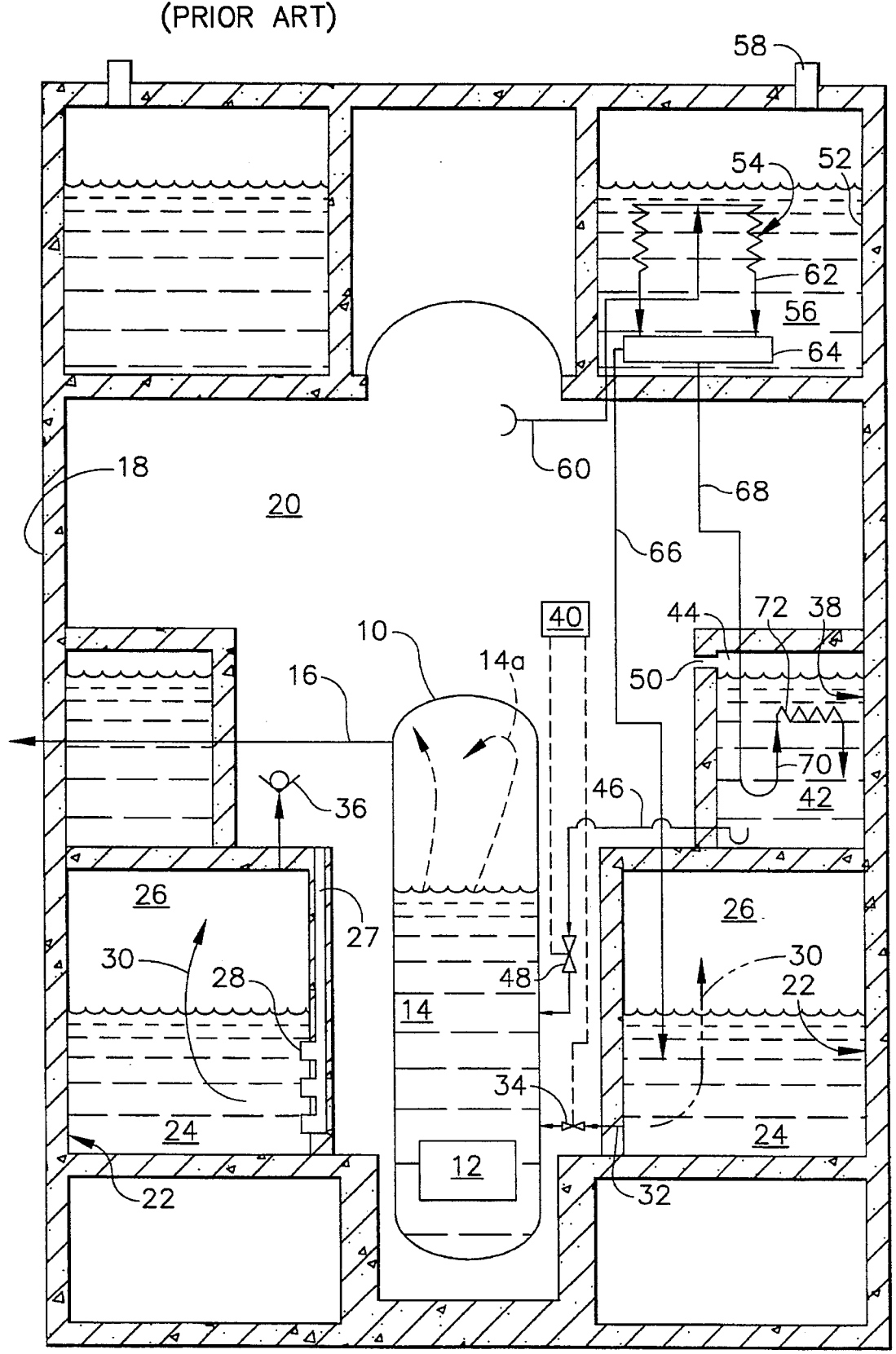
FIG. 1 is a schematic elevational sectional view of a boiling water reactor having a passive containment cooling system in accordance with a known design.
Figure 2:
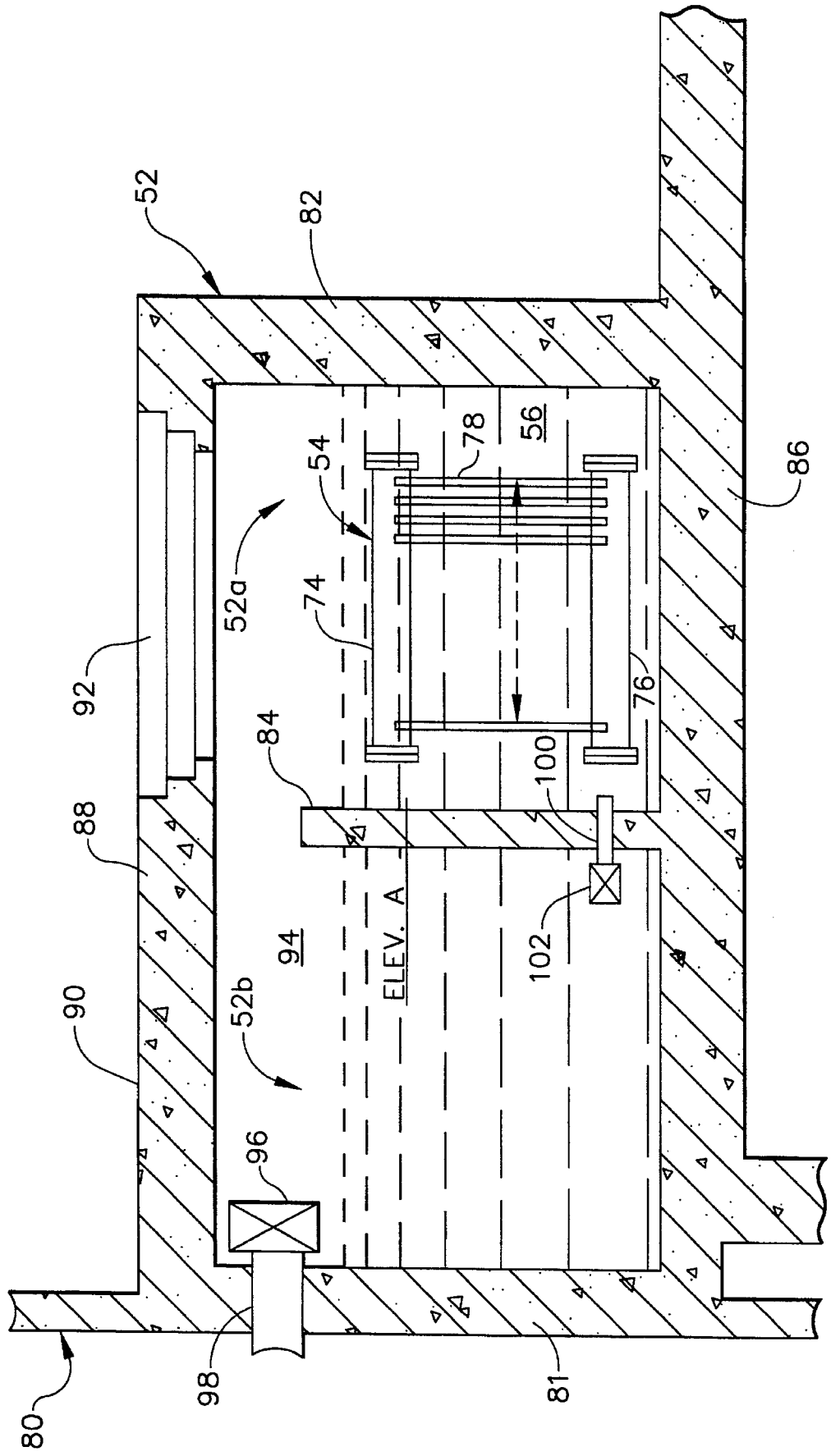
FIG. 2 is a schematic elevational sectional view of a portion of the condenser pool of the boiling water reactor shown in FIG. 1.
Figure 3:
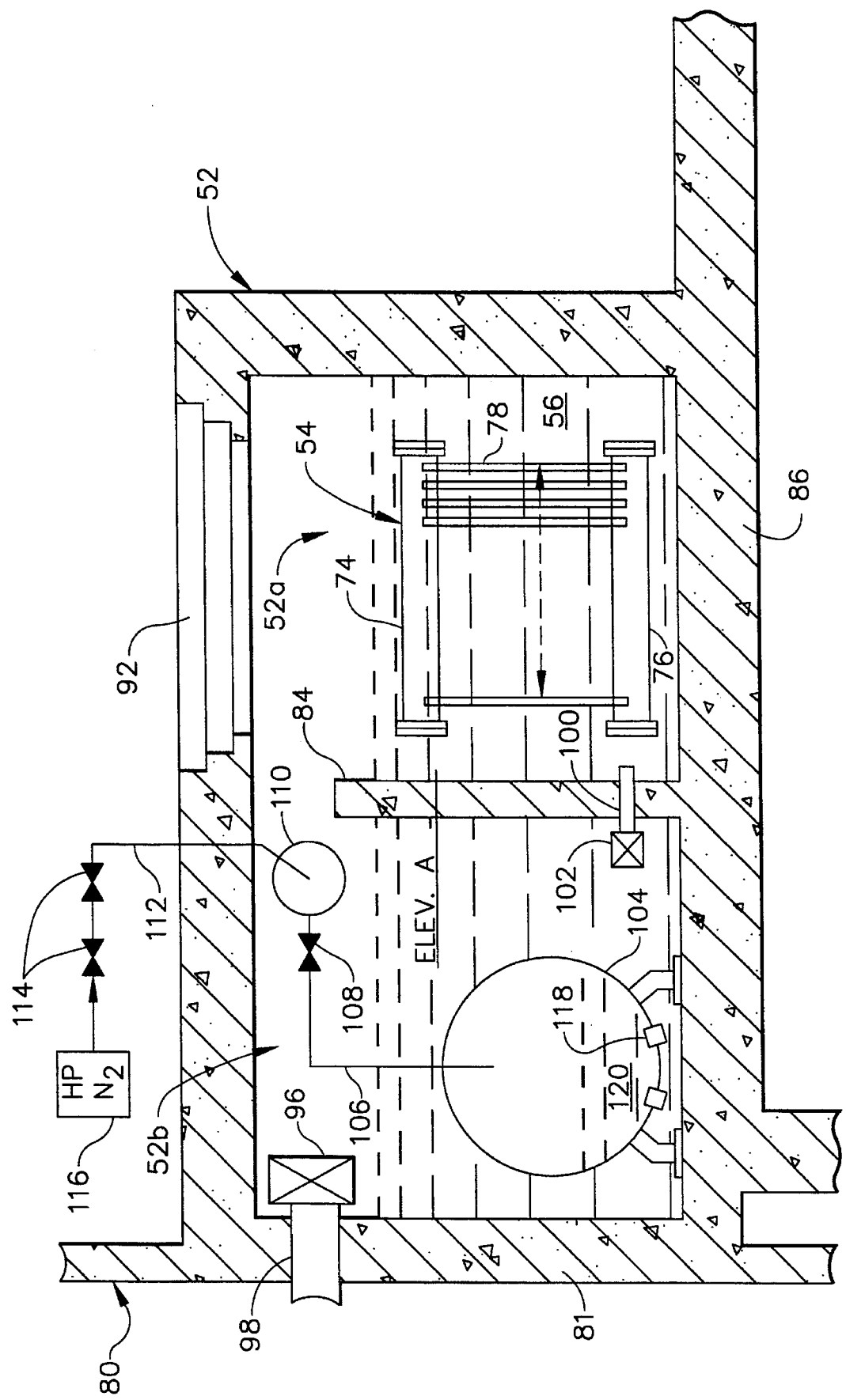
FIG. 3 is a schematic elevational sectional view of a portion of an condenser pool in accordance with a preferred embodiment of the present invention.

Referring to FIG. 3, the preferred embodiment of the present invention comprises a water-filled tank 104 of appropriate shape, containing one or more holes or openings 118 at its lowermost periphery, positioned at an appropriate location within an auxiliary pool chamber 52b. Tank 104 is connected via piping 106 and valving 108 to a high-pressure gas-charged pneumatic tank 110 of appropriate volume, positioned at an appropriate location within reactor building 80. Valve 108 is normally closed, but can be opened at an appropriate time following a LOCA. Preferably, valve 108 is a passive-type valve, such as a squib (i.e., explosive-actuated) valve. Valve 108 opens in response to appropriate control signals from various monitors (not shown) which sense the course of the LOCA, including the drawdown status of the water level in pool chamber 52a and/or auxiliary pool chamber 52b.

When valve 108 opens, high-pressure gas, such as nitrogen, inside tank 110 is released to flow passively through piping 106 to pressurize the interior of tank 104. In so doing, the initial water contents 120 of tank 104 are expelled through openings 118. Inasmuch as the expelled contents 120 are discharged to auxiliary pool chamber 52b, the height of this pool chamber will at first tend to increase. However, by the gravity-driven passive leveling of all condenser pool chambers, water will also flow into pool chamber 52a, thereby augmenting the water inventory in pool chamber 52a and allowing credit for further boiloff heat transfer through PCC heat exchanger 54.

Gas injected into tank 104 will remain trapped throughout the subsequent course of the LOCA transient, and will thereby essentially displace the initial contents 120 into pool chamber 52a and 52b. This trapping action is facilitated by selection of a gas which does not readily go into solution in water. The preferred such gas is nitrogen.

The broad concept of the invention is not limited to any specific design of the volume inside pneumatic tank 110. Any excess gas released into tank 104 will simply escape tank 104 through openings 118 and then be carried upward as bubbles through the water in pool chamber 52b. At the surface of the water in auxiliary pool chamber 52b, the gas blends smoothly with steam passing through moisture separator/dryer 96 and piping/ducting 98 to escape to the environs. This escaping gas has no adverse consequences vis-a-vis the PCC heat exchange process underway in pool chamber 52a.

In accordance with one preferred embodiment of the invention, pneumatic tank 110 is instrumented for monitoring its state-of-charge (i.e., pressure) and is connected via piping 112 and valving 114 to a high-pressure nitrogen supply 116. The high-pressure nitrogen supply 116 enables the charge-up of tank 110 to requisite pressure to accomplish the expelling of a design amount of water inventory from tank 104.

In accordance with an alternative embodiment, tank 104 may comprise a plurality of partitioned sections and appropriate valving to provide redundancy. Such an arrangement prevents a rupture in one section, or its connected piping, from compromising the water-expelling action of other unaffected sections. In like fashion, pneumatic tank 110 may comprise a plurality of units connected to tank 104 via appropriate valving.

In accordance with a further variation, one or more pressure-regulating valves can be incorporated in piping 106 to limit the peak pressure which tank 104 must be designed to withstand.

Alternatively, tank 104 could, instead of being a fixed-form tank, comprise an inflatable bladder secured by appropriate means to a selected region of auxiliary pool chamber 52b.

Further, wall 81 could be made slidable in a direction perpendicular to wall 84. As wall 81 moved closer to wall 84, the volume inside auxiliary pool chamber 52b would decrease, causing the water level to tend to rise. Thus a movable wall can be used to accomplish the same effect, i.e., a rise in the water level in auxiliary pool chamber 52b, as that achieved by injecting gas into and expelling water from tank 104.

In accordance with another design, tank 104 in auxiliary pool chamber 52b can be replaced by one or more smaller tanks located in pool chamber 52a to the extent that available space may exist within the given design arrangement. Alternatively, the smaller tanks in pool chamber 52a can be used in conjunction with, rather than substituted for, tank 104 in auxiliary pool chamber 52b.

In accordance with another preferred embodiment of the invention, the pneumatic tank 110 (see FIG. 3) can be combined with the nitrogen accumulator tank 118 (shown in FIG. 4) of a standby liquid control system (SLCS) for shutting down the reactor from full power, without assistance from control rod insertion, by using high-pressure nitrogen to inject a neutron-absorbing solution into the core.

Figure 4:
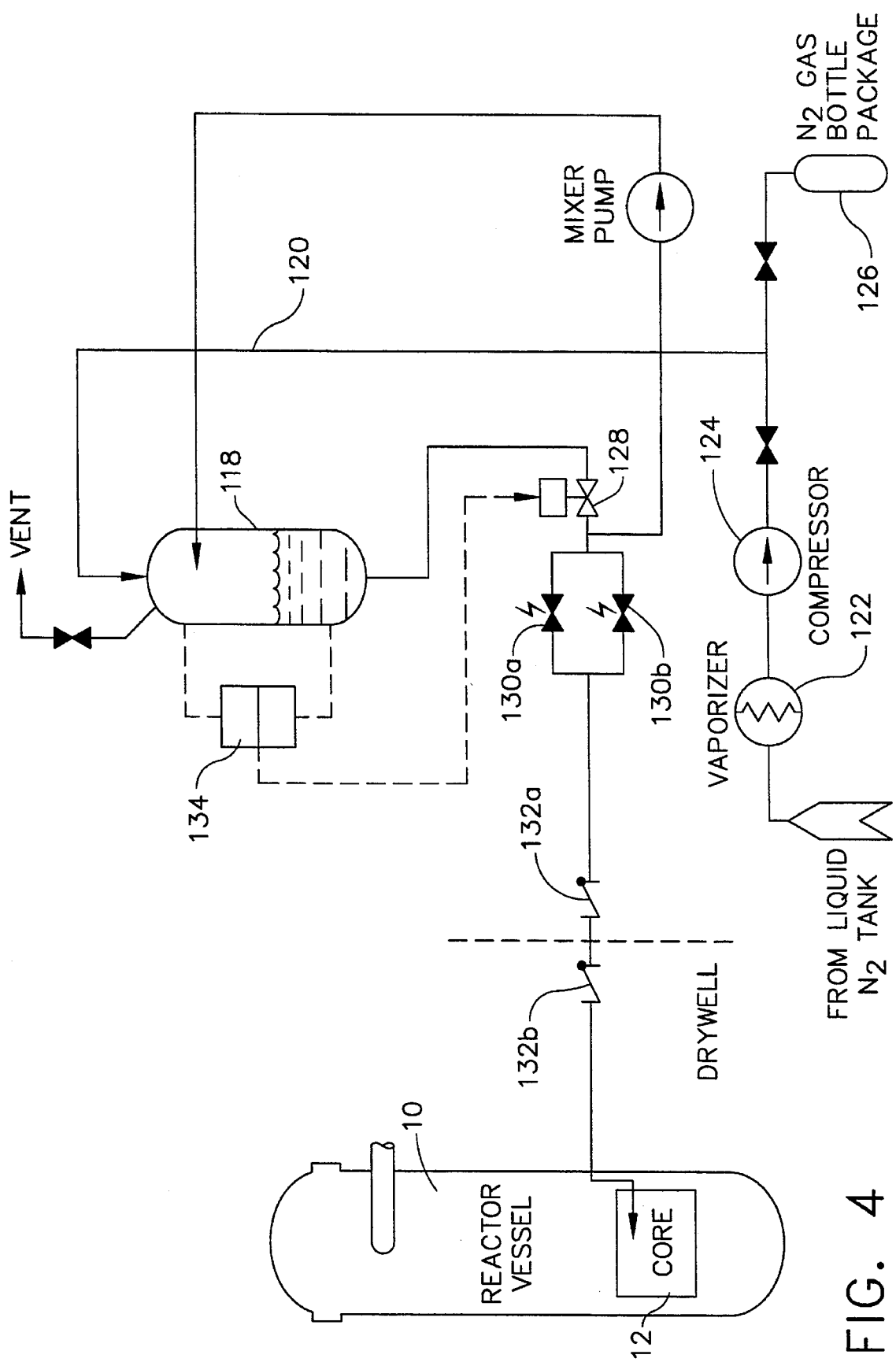
FIG. 4 is a block diagram of a known standby liquid control system for a BWR.

Referring to FIG. 4, the accumulator 118 of the SLCS comprises a tank partially filled with a 12.5% solution of isotopically enriched sodium pentaborate and the remaining volume being filled with pressurized nitrogen. The sodium pentaborate solution is neutron-absorbing and is intended to be injected into the fuel core for the purpose of moderating the fission reaction therein under certain conditions. The accumulator 118 is filled with pressurized nitrogen via a pneumatic line 120, which is connected to a tank (not shown) of liquid $N_2$ via a vaporizer 122 and a compressor 124. Because of continual outleakage of pressurized nitrogen through fittings, pinhole leaks, etc., the gasified liquid nitrogen also fills up one or more gas bottles 126 with nitrogen gas to be used as makeup for leakage. The accumulator 118 outlet is connected to the fuel core 12 via piping and valving 128, 130a, 130b, 132a and 132b. Valve 128 is a quick-closing pneumatic valve which is normally open. Valves 130a and 130b are squib (i.e., explosive-actuated) valves which are connected in parallel and which are normally closed. Valves 132a and 132b are isolation check valves which are connected in series and will open, and close, under suitable differential pressures. In response to certain emergency conditions, the primer fires an explosive charge that blasts open a gate or disk inside squib valves 130a and 130b. As a result, the borate solution is forced out of the accumulator 118 by the pressurized nitrogen and flows into the fuel core 12. When a level transmitter 134 detects that the level of solution in accumulator 118 has reached the bottom, the level transmitter actuates the pneumatic valve 128 to close quickly to prevent the flow of nitrogen into the reactor.

In accordance with the proposed embodiment, accumulator 118 in FIG. 4 could, given the addition of suitable piping as shown in FIG. 3, also serve the function of tank 110. The design basis scenario which calls for SLCS accumulator action to discharge the poison solution into the reactor under an "anticipated transients without scram" event, is distinct and separate from any event which calls for tank 110 to function to expel water from tank 104. Because the required pneumatic services are non-coincidental, the existing SLCS accumulator can serve both functions. In so doing, tank 110 in FIG. 3 can be either downsized considerably or eliminated altogether.

The foregoing preferred embodiments have been disclosed for the purpose of illustration. Other variations and modifications will be apparent to persons skilled in the design of passive pressure suppression systems for boiling water reactors. All such variations and modifications are intended to be encompassed by the claims set forth hereinafter.

What is claimed is:

1. A method for raising the water level in a condenser pool having a condenser at least partly submerged in water when the water level is at a predetermined elevation, comprising the steps of:

anchoring a structure in the condenser pool so that at least a portion of said structure is submerged in water, said structure being suitable for retaining a gas at an elevation below a predetermined water level in said condenser pool, and injecting a volume of gas into said gas retaining structure, whereby an equal volume of water in said condenser pool is displaced from an elevation below said predetermined elevation to an elevation above said predetermined elevation without adding water into the condenser pool.

2. The method as defined in claim 1, wherein said volume of gas is injected from an accumulator containing a poison solution and pressurized nitrogen gas.

3. A method for raising the water level in a condenser pool of a boiling water reactor having a condenser at least partly submerged in water when the water level in the condenser pool is at a predetermined elevation, comprising the steps of:

injecting gas into a volume which is submerged in the water in the condenser pool; and retaining the injected gas in said volume, whereby an equal volume of water in said condenser pool is displaced from an elevation below said predetermined elevation to an elevation above said predetermined elevation without adding water into the condenser pool.

4. The method as defined in claim 3, wherein the gas is injected from an accumulator containing a poison solution and pressurized nitrogen gas.

\* \* \* \* \*